US008780878B2

(12) United States Patent
Lin

(10) Patent No.: US 8,780,878 B2
(45) Date of Patent: Jul. 15, 2014

(54) METHOD AND APPARATUS TO IMPROVE APERIODIC SRS (SOUNDING REFERENCE SYMBOL) IN A WIRELESS COMMUNICATION SYSTEM

(75) Inventor: Ko-Chiang Lin, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 125 days.

(21) Appl. No.: 13/426,085

(22) Filed: Mar. 21, 2012

(65) Prior Publication Data

US 2012/0243505 A1 Sep. 27, 2012

Related U.S. Application Data

(60) Provisional application No. 61/466,337, filed on Mar. 22, 2011, provisional application No. 61/478,376, filed on Apr. 22, 2011.

(51) Int. Cl.
*H04B 7/208* (2006.01)

(52) U.S. Cl.
USPC .......................................... 370/344; 370/329

(58) Field of Classification Search
USPC ......... 370/329, 328, 341, 384, 344, 208, 210; 375/240.27
See application file for complete search history.

(56) References Cited

U.S. PATENT DOCUMENTS 8,385,277 B2 * 2/2013 Nishikawa et al. ........... 370/329

FOREIGN PATENT DOCUMENTS

WO 2010151089 A2 12/2010

OTHER PUBLICATIONS

3GPP TSG RAN WG2 #70, Montreal, Canada, May 10-14, 2010.
3GPP TSG RAN WG2 Meeting #72, Jacksonville, U.S.A., Nov. 15-19, 2010.
Search Report on corresponding EP Patent Application No. 12002045.8 dated Aug. 6, 2012.

* cited by examiner

*Primary Examiner* — Chandrahas Patel
(74) *Attorney, Agent, or Firm* — Blue Capital Law Firm, P.C.

(57) ABSTRACT

A method and apparatus are disclosed for aperiodic SRS improvement. In one embodiment, the method comprises configuring a UE (User Equipment) with aperiodic SRS. The method also comprises transmitting a PUSCH (Physical Uplink Shared Channel) on a last SC-FDMA (Single Carrier-Frequency Division Multiple Access) symbol in a UE-specific aperiodic SRS subframe if a Msg3 in the subframe is transmitted on the PUSCH. Furthermore, the method comprises not transmitting a PUSCH on a last SC-FDMA symbol in a UE-specific aperiodic SRS subframe if a Msg3 in the subframe is not transmitted on the PUSCH.

18 Claims, 5 Drawing Sheets

METHOD AND APPARATUS TO IMPROVE APERIODIC SRS (SOUNDING REFERENCE SYMBOL) IN A WIRELESS COMMUNICATION SYSTEM

CROSS-REFERENCE TO RELATED APPLICATIONS

The present Application claims the benefit of U.S. Provisional Patent Application Ser. No. 61/466,337 filed on Mar. 22, 2011 and U.S. Provisional Patent Application Ser. No. 61/478,376 filed on Apr. 22, 2011, the entire disclosures of which are incorporated herein by reference.

FIELD

This disclosure generally relates to wireless communication networks, and more particularly, to a method and apparatus to improve aperiodic SRS in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to improve aperiodic SRS in a wireless communication system. In one embodiment, the method comprises configuring a UE (User Equipment) with aperiodic SRS. The method also comprises transmitting a PUSCH (Physical Uplink Shared Channel) on a last SC-FDMA (Single Carrier-Frequency Division Multiple Access) symbol in a UE-specific aperiodic SRS subframe if a Msg3 in the subframe is transmitted on the PUSCH. Furthermore, the method comprises not transmitting a PUSCH on a last SC-FDMA symbol in a UE-specific aperiodic SRS subframe if a Msg3 in the subframe is not transmitted on the PUSCH.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced). 3GPP2 UMB (Ultra Mobile Broadband), WiMax, or some other modulation techniques.

In particular, The exemplary wireless communication systems devices described below may be designed to support one or more standards such as the standard offered by a consortium named "3rd Generation Partnership Project" referred to herein as 3GPP, including Document Nos. TR 36.816 V1.2.0, "Study on signalling and procedure for interference avoidance for in-device coexistence (Release 10)"; TS 36.331 V10.0.0. "RRC protocol specification (Release 10)"; R2-106399. "Potential mechanism to realize TDM pattern"; TS 36.321 V10.0.0, "MAC protocol specification (Release 10)"; RP-110181, "New Study Item Proposal: Mobile Relay for EUTRA"; TS 36.300 V10.2.0, "E-UTRA and E-UTRAN; Overall description; Stage 2"; TR 36.805-900, "Study on Minimization of drive-tests in Next Generation Networks (Release 9)"; TS 36.213 V10.0.0, "Physical layer procedures (Release 10)"; TS 36.211 V9.1.0, "Physical Channels and Modulation (Release 9)"; TS 36.212 V9.3.0, "Multiplexing and channel coding (Release 9)"; TS 36.211 V10.0.0, "Physical Channels and Modulation (Release 10)"; TS 36.212 V10.0.0, "Multiplexing and channel coding (Release 10)"; and RP-110398, "New Study Item Proposal: Mobile Relay for EUTRA". The standards and documents listed above are hereby expressly incorporated herein.

Figure 1:
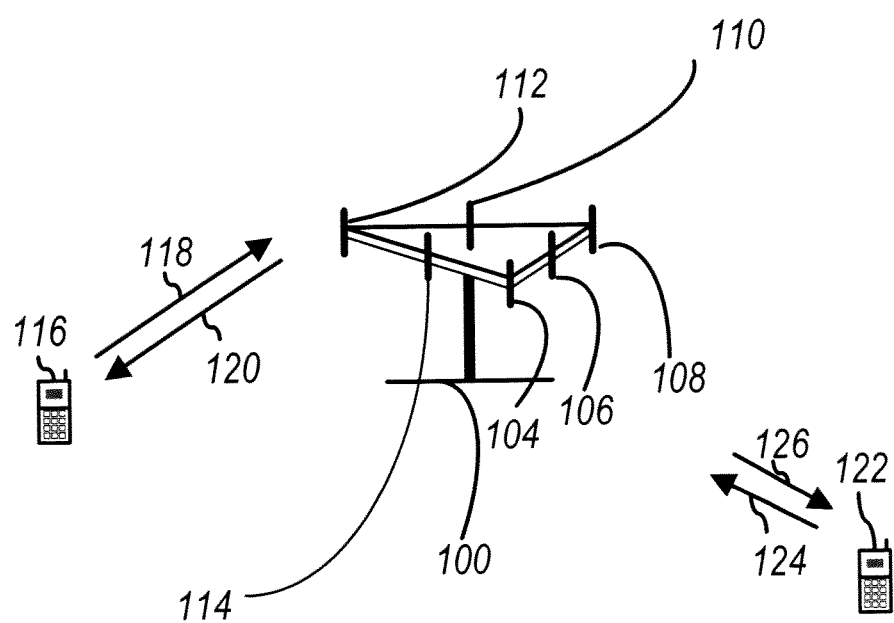
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
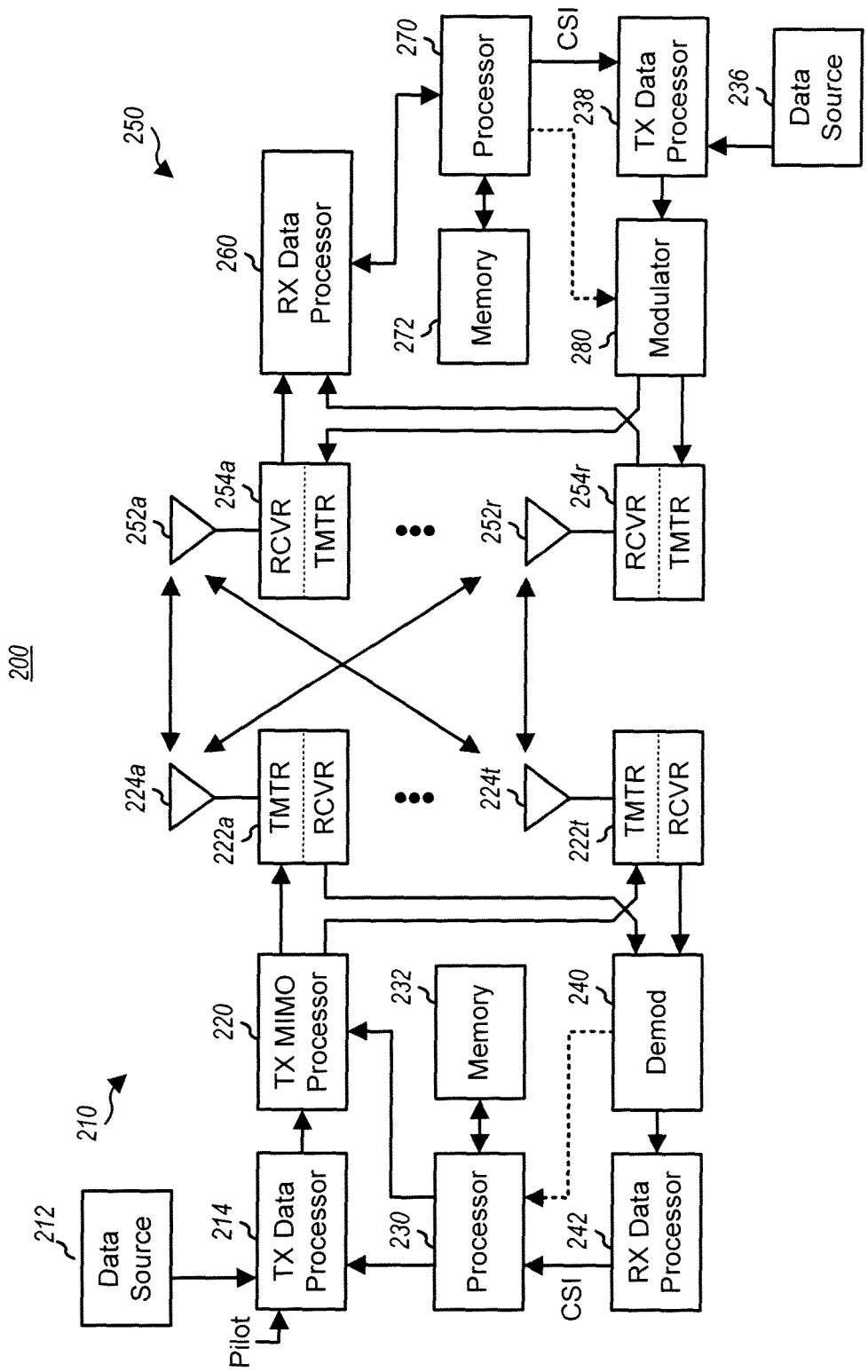
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (LIE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
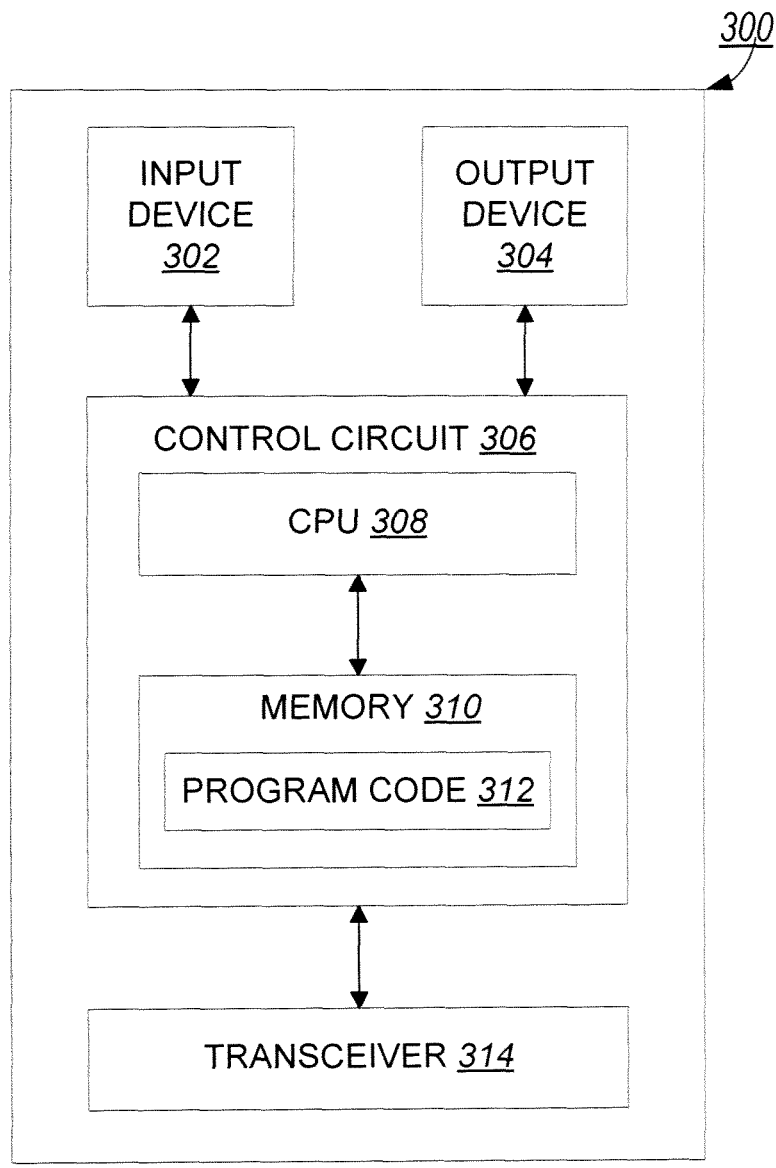
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
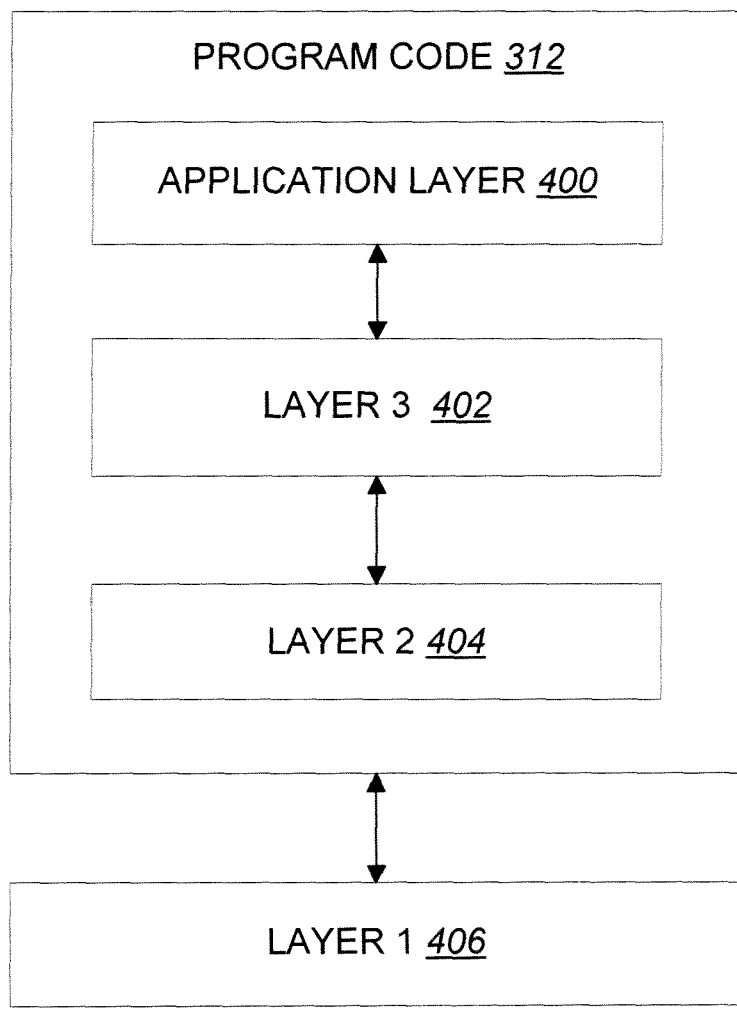
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In general, as discussed in 3GPP TS 36.213 V10.0.0, aperiodic SRS (Sounding Reference Symbol), also known as trigger type 1 SRS, was introduced to allow eNB (evolved Node B) to efficiently and flexibly manage the SRS resource as well as the periodic SRS. Periodic SRS could be triggered by RRC signaling and transmitted according to configured SRS parameters. Aperiodic SRS could be triggered by the triggering bit(s) on the Physical Downlink Control Channel (PDCCH) and transmitted according to configured SRS parameters. Due to the different natures of PDCCH signaling and Radio Resource Control (RRC) signaling, aperiodic SRS could be triggered with lower latency while suffering from the less robustness as PDCCH signaling is less reliable and could be missed.

In general, SRS is transmitted on the last SC-FDMA (Single Carrier-Frequency Division Multiple Access) symbol for FDD (Frequency Division Duplex) and for uplink subframe of TDD (Time Division Duplex). There is cell-specific SRS subframe defined for a cell to inform UE where the SRS is possible to be transmitted and the also the maximum bandwidth of SRS. As discussed in 3GPP TS 36.211 V9.1.0, for periodic SRS, UE is configured a UE-specific SRS subframe where SRS is to be transmitted by the UE. In case a UE transmits PUSCH (Physical Uplink Shared Channel) and SRS in the same subframe, the last SC-FDMA symbol of PUSCH will be rate-matched, as discussed in 3GPP TS 36.211 V9.1.0 and TS 36.212 V9.3.0. In other words, PUSCH signaling will be absent on the last SC-FDMA symbol and the available resource on PUSCH for encoded bits will not take the last SC-FDMA symbol into account. Furthermore, since UE is not aware of whether the SRS resource in cell-specific SRS subframe would be occupied by other UEs, UE would rate-match the last SC-FDMA of PUSCH if the PUSCH is transmitted in cell-specific SRS subframe and the PUSCH overlaps with the maximum SRS bandwidth in the frequency domain.

With the introduction of aperiodic SRS, there is uncertainty as to whether aperiodic SRS is triggered or not. The uncertainty causes some problems for eNB in determining whether the transmitted PUSCH is rate-matched or not in some cases. For example, in the case where the subframe (which could be a cell-specific SRS subframe) in which aperiodic SRS is triggered, UE would rate-match its last SC-FDMA symbol of PUSCH within the same cell. However, if the UE does not detect the trigger and the PUSCH does not overlap with the maximum SRS bandwidth, UE would not rate-match the last SC-FDMA symbol of PUSCH.

As discussed in TS 36.321 V10.0.0, UE performs a random access procedure to obtain uplink grant or to acquire uplink transmission timing. The random access procedure may be as follows: (i) UE first send a preamble to eNB and waiting for the response from eNB; (ii) the response contains a uplink grant for UE to send Msg3 (or Message 3); and (iii) after sending Msg3, UE waiting for contention resolution to complete the procedure. In one embodiment, the random access procedure could be triggered by a PDCCH order, an arrival of uplink (UL) data (such has when higher priority data arrives while there is no scheduling request), or a handover.

For a contention-based random access procedure, UE would randomly select a preamble to transmit according to specific rule. In addition, eNB could identify the UE after receiving Msg3 successfully. For a non-contention based random access procedure, UE would send a dedicated preamble that eNB could identify upon receipt.

As discussed in TS 36.213 V10.0.0, when adjusting the UL (uplink) transmission timing, eNB would send timing advance command to UE, and UE would adjust its uplink timing six subframes later. More specifically, for a timing advance command received on subframe n, the corresponding timing adjustment shall apply from the beginning of subframe n+6. When the UE's uplink PUCCH/PUSCH/SRS transmissions in subframe n and subframe n+1 are overlapped due to the timing adjustment, the UE shall transmit complete subframe n and not transmit the overlapped part of subframe n+1.

In a UE-specific aperiodic SRS subframe, UE would rate-match its last SC-FDMA symbol of PUSCH within the same cell. However, if the PUSCH is for Msg3 transmission, eNB would not be able ensure which UE is sending the PUSCH, and would not know whether the corresponding subframe belongs to UE-specific aperiodic SRS subframe of the transmitting UE. Therefore, eNB would be required to blindly decode the PUSCH, and would have to assume that rate-matching was performed or not performed.

Figure 5:
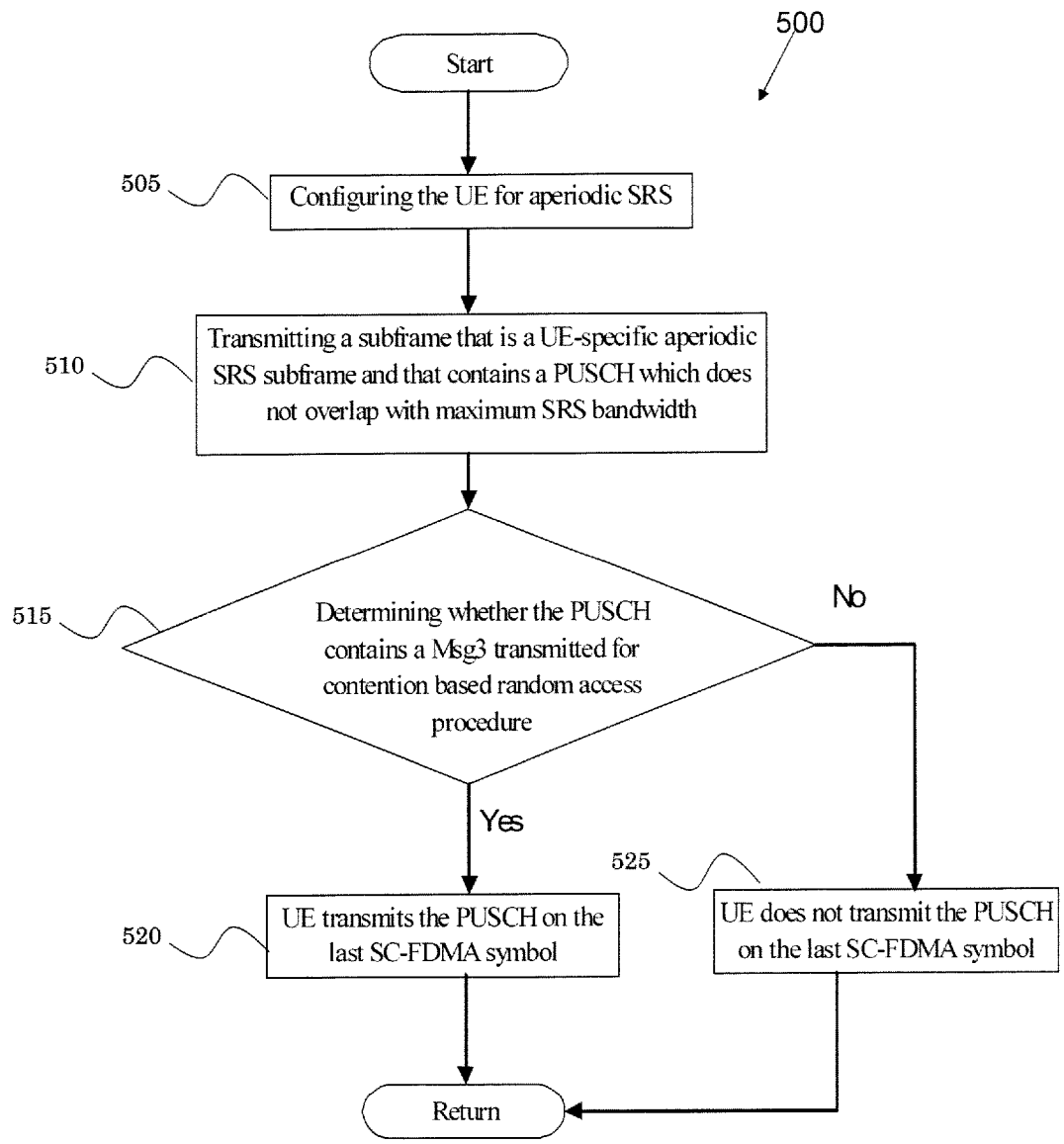
FIG. 5 is a flow chart according to one exemplary embodiment.

FIG. 5 illustrates a flow chart 500 in accordance with one exemplary embodiment. In step 505, a UE is configured for aperiodic SRS. In step 510, the UE transmits a subframe that is a UE-specific aperiodic SRS subframe and that contains a PUSCH which does not overlap with maximum SRS bandwidth. In step 515, it is determined whether the PUSCH contains a Msg3 for contention-based random access procedure. If the PUSCH contains a Msg3 for contention-based random access procedure, the UE would transmit the PUSCH on the last SC-FDMA symbol, as shown in step 520. Otherwise, if the PUSCH does not contain a Msg3 for contention-based random access procedure, the UE would not transmit the PUSCH on the last SC-FDMA symbol, as shown in step 525.

To avoid the blind decoding of PUSCH on the eNB, when a UE is configured with aperiodic SRS, if Msg3 is transmitted within the UE-specific aperiodic SRS subframe of the same cell and the corresponding PUSCH does not overlap with the maximum SRS bandwidth, the last SC-FDMA symbol of the corresponding PUSCH would be transmitted. The PUSCH would be carried on the SC-FDMA symbols (including the last symbol) in a subframe. Furthermore, rate-matching of the PUSCH would be performed in accordance with the SC-FDMA symbols in a subframe. In addition, the last SC-FDMA symbol of the PUSCH would not be rate-matched.

Furthermore, within the UE-specific aperiodic SRS subframe of the same cell, if a PUSCH does not contain Msg3 and does not overlap with the maximum SRS bandwidth, the last SC-FDMA symbol of the corresponding PUSCH would not be transmitted. Also, the last SC-FDMA symbol of the PUSCH that does not contain Msg3 would be rate-matched. In addition, the UE's C-RNTI would initialize the scrambling of the PUSCH that does not contain Msg3.

Alternatively, when a UE is configured with aperiodic SRS, if Msg3 is transmitted within the cell-specific SRS subframe of the same cell, the last SC-FDMA symbol of the corresponding PUSCH would not be transmitted. In addition, the last SC-FDMA symbol of PUSCH that does not carry Msg3 would be transmitted if the PUSCH doesn't overlap the maximum SRS bandwidth. Furthermore, rate matching would be performed in accordance with the number of SC-FDMA symbols transmitted.

In one embodiment, Msg3 corresponds to a contention based random access procedure. In another embodiment, the alternatives could be applied to a Random Access procedure triggered by a PDCCH order, UL data arrival, or handover.

In general, scrambling is applied to PUSCH transmissions. As discussed in TS 36.211 V10.0.0, the scrambling sequence generator is initialized with $c_{init} = n_{RNTI} \cdot 2^{14} + q \cdot 2^{13} + \lfloor n_s/2 \rfloor \cdot 2^9 + N_{ID}^{cell}$, where $n_{RNTI}$ corresponds to the RNTI (Radio Network Temporary Identifier) associated with the PUSCH transmission.

In 3GPP TS 36.213 V10.0.0, the associated RNTI is defined as follows:
A UE is semi-statically configured via higher layer signalling to transmit PUSCH transmissions signalled via PDCCH (Physical Downlink Control Channel) in one of two uplink transmission modes (denoted mode 1 and mode 2) as defined in Table 8-3 of 3GTPP TS 36.213 V10.0.0. If a UE is configured by higher layers to decode PDCCHs with the CRC (Cyclic Redundancy Check) scrambled by the C-RNTI (Cell Radio Network Temporary Identifier), the UE shall decode the PDCCH according to the combination defined in Table 8-3 and transmit the corresponding PUSCH. Furthermore, the scrambling initialization of the PUSCH corresponding to the PDCCHs and the PUSCH retransmission for the same transport block is by C-RNTI. Transmission mode 1 is the default uplink transmission mode for a UE until the UE is assigned an uplink transmission mode by higher layer signalling.

If a UE is configured by higher layers to decode PDCCHs with the CRC scrambled by the SPS (Semi-Persistent Scheduling) C-RNTI, the UE shall decode the PDCCH according to the combination defined in Table 8-5 of 3GPP TS 36.213 V10.0.0, and transmit the corresponding PUSCH. The scrambling initialization of the PUSCH corresponds to these PDCCHs and the PUSCH retransmission for the same transport block is by SPS C-RNTI. Also, the scrambling initialization of initial transmission of the PUSCH without a corresponding PDCCH and the PUSCH retransmission for the same transport block is by SPS C-RNTI.

If a UE is configured by higher layers to decode PDCCHs with the CRC scrambled by the Temporary C-RNTI regardless of whether UE is configured or not configured to decode PDCCHs with the CRC scrambled by the C-RNTI, the UE shall decode the PDCCH and transmit the corresponding PUSCH. The scrambling initialization of PUSCH corresponding to these PDCCH is by Temporary C-RNTI.

If a Temporary C-RNTI is set by higher layers, the scrambling of PUSCH corresponding to the Random Access Response Grant in Section 6.2 of 3GPP TS 36.213 V10.0.0 and the PUSCH retransmission for the same transport block is by Temporary C-RNTI. Else, the scrambling of PUSCH corresponding to the Random Access Response Grant in Section 6.2 3GPP TS 36.213 V10.0.0 and the PUSCH retransmission for the same transport block is by C-RNTI.

Referring back to FIGS. 3 and 4, the UE 300 includes a program code 312 stored in memory 310. In one embodiment, the CPU 308 could execute the program code 312 to configure a UE (User Equipment) with aperiodic SRS, and to transmit a PUSCH (Physical Uplink Shared Channel) on a last SC-FDMA (Single Carrier-Frequency Division Multiple Access) symbol in a UE-specific aperiodic SRS subframe if a Msg3 in the subframe is transmitted on the PUSCH. Furthermore, the PUSCH does not overlap with a maximum SRS bandwidth. Also, the UE does not transmit the PUSCH on the last SC-FDMA symbol in the subframe if the PUSCH does not contain the Msg3.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method to implement SRS (Sounding Reference Symbol), comprising:
    configuring a UE (User Equipment) with aperiodic SRS; and
    transmitting a PUSCH (Physical Uplink Shared Channel) on a last SC-FDMA (Single Carrier-Frequency Division Multiple Access) symbol in a UE-specific aperiodic SRS subframe if a Msg3 in the subframe is transmitted on the PUSCH, wherein the PUSCH does not overlap with a maximum SRS bandwidth.

2. The method of claim 1, wherein a SPS (Semi-Persistent Scheduling) C-RNTI performs a scrambling initialization of the PUSCH if the PUSCH does not contain the Msg3.

3. The method of claim 1, wherein the Msg3 is transmitted in a contention-based random access procedure.

4. The method of claim 3, wherein the random access procedure is triggered by a PDCCH (Physical Downlink Control Channel) order.

5. The method of claim 3, wherein the random access procedure is triggered by an arrival of uplink (UL) data.

6. The method of claim 3, wherein the random access procedure is triggered by a handover.

7. The method of claim 1, wherein a rate-matching of the PUSCH is based on SC-FDMA symbols in the subframe.

8. The method of claim 7, wherein the rate-matching of the PUSCH excludes the last SC-FDMA symbol in the subframe.

9. The method of claim 1, wherein the UE does not rate-match the last SC-TDMA symbol of the PUSCH.

10. The method of claim 1, wherein the UE does not transmit a SRS in the subframe.

11. The method of claim 1, wherein the UE does not transmit the PUSCH on the last SC-FDMA symbol in the subframe if the PUSCH does not contain the Msg3.

12. The method of claim 1, wherein a C-RNTI (Cell Radio Network Temporary Identifier) performs a scrambling initialization of the PUSCH if the PUSCH does not contain the Msg3.

13. A communication device for use in a wireless communication system, the communication device comprising:
    a control circuit;
    a processor installed in the control circuit;
    a memory installed in the control circuit and coupled to the processor;
    wherein the processor is configured to execute a program code stored in memory to implement SRS (Sounding Reference Symbol) by:
        configuring a UE (User Equipment) with aperiodic SRS; and
        transmitting a PUSCH (Physical Uplink Shared Channel) on a last SC-FDMA (Single Carrier-Frequency Division Multiple Access) symbol in a UE-specific aperiodic SRS subframe if a Msg3 in the subframe is transmitted on the PUSCH, wherein the PUSCH does not overlap with a maximum SRS bandwidth.

14. The device of claim 13, wherein a C-RNTI (Cell Radio Network Temporary Identifier) performs a scrambling initialization of the PUSCH if the PUSCH does not contain the Msg3.

15. The device of claim 13, wherein a SPS (Semi-Persistent Scheduling) C-RNTI performs a scrambling initialization of the PUSCH if the PUSCH does not contain the Msg3.

16. The device of claim 13, wherein the UE does not transmit the PUSCH on the last SC-FDMA symbol in the subframe if the PUSCH does not contain the Msg3.

17. The device of claim 13, wherein a rate-matching of the PUSCH is based on SC-FDMA symbols in the subframe.

18. The device of claim 13, wherein the UE does not transmit the PUSCH on the last SC-FDMA symbol in the subframe if the PUSCH does not contain the Msg3.

* * * * *